United States Patent [19]
Bennett

[11] 3,848,985
[45] Nov. 19, 1974

[54] AUTOMATIC EXPOSURE CONTROL SYSTEM

[75] Inventor: Stewart Bennett, Concord, Mass.
[73] Assignee: Polaroid Corporation, Cambridge, Mass.
[22] Filed: Dec. 7, 1973
[21] Appl. No.: 422,972

Related U.S. Application Data
[63] Continuation of Ser. No. 214,632, Jan. 3, 1972, abandoned.

[52] U.S. Cl. ..................... 354/41, 354/42, 354/21
[51] Int. Cl. ............................................. G03b 7/08
[58] Field of Search ............ 95/10 C, 10 FS, 31 FS; 352/78 C

[56] References Cited
UNITED STATES PATENTS

| | | | |
|---|---|---|---|
| 3,176,599 | 4/1965 | Anwyl | 95/10 C |
| 3,208,363 | 9/1965 | Easterly et al. | 95/10 C X |
| 3,312,158 | 4/1967 | MacMillin et al. | 95/10 FS |
| 3,444,798 | 5/1969 | Mayr et al. | 95/10 C X |

Primary Examiner—Samuel S. Matthews
Assistant Examiner—Michael L. Gellner
Attorney, Agent, or Firm—David R. Thornton

[57] ABSTRACT

An automatic exposure control system for motion picture cameras in which a dual aperture iris driven by a nulling galvanometer in a bridge circuit with a photocell controls the aperture stop setting of the camera. The system is automatically correlated to the specific values of film speeds by sectors of graduated light filtering densities on an indexable filter disc positioned in front of the photocell and indexed by a lug on a cassette containing the film. The location of the lug or the cassette is correlated to the speed of film loaded therein. A different notch on the cassette is correlated to one of a plurality of mutually exclusive ranges of film speed and adjusts the operating range of the bridge circuit upon insertion of the cassette into the camera.

18 Claims, 7 Drawing Figures

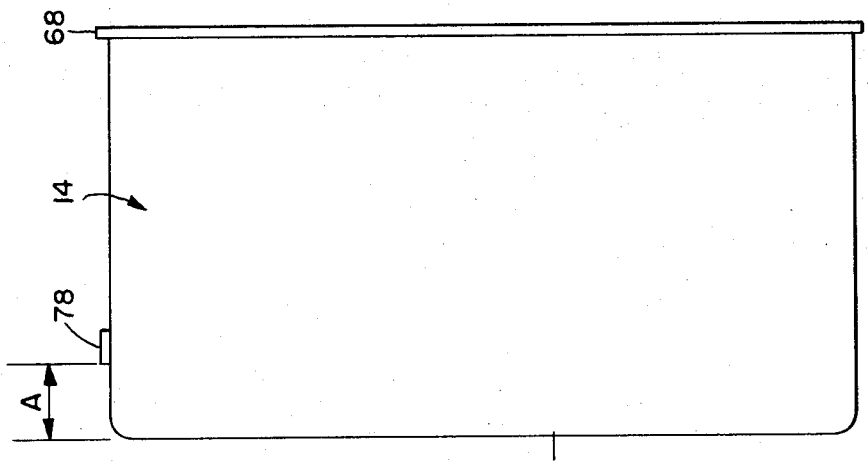
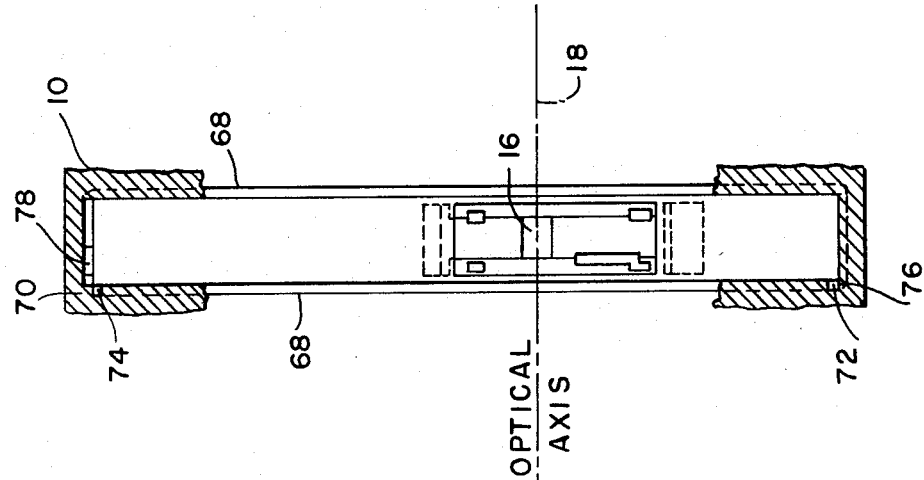
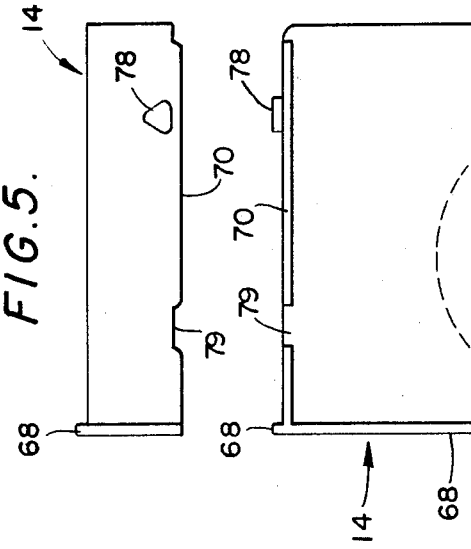
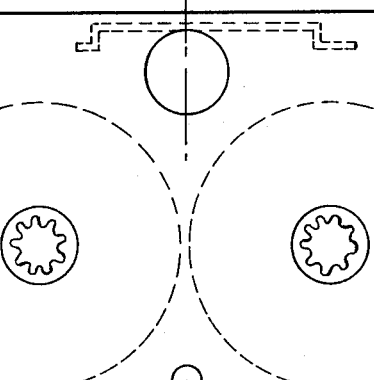

AUTOMATIC EXPOSURE CONTROL SYSTEM

This is a continuation of application Ser. No. 214,632, filed Jan. 3, 1972, now abandoned.

BACKGROUND OF THE INVENTION

This invention relates to improvements in automatic exposure control systems for photographic cameras. More particularly, it concerns an unique apparatus especially suited for use in motion picture cameras designed to receive film containing cassettes and in which the exposure control system is adjusted automatically upon cassette insertion to accommodate any of several diverse film sensitivities or speeds, the speed of the film contained by a particular cassette being correlated with coded tactile discontinuities on that cassette.

Automatic exposure control systems for motion picture cameras are known to include a photoresistive cell and a nulling or balanced circuit by which a galvanometer operates an iris diaphragm on the objective axis of the camera. The appropriate diaphragm stop for proper exposure of a given speed film and scene light may be achieved in such systems by coupling the object iris to an auxiliary iris or its equivalent positioned in front of the photoresistive cell. In this way, the cell will operate both iris diaphragms until the galvanometer circuit is balanced or nulled by the internal resistance of the circuit, the latter being capable of electrical adjustment for correlation to different film speeds. Such systems possess the advantage of achieving the final diaphragm setting or stop, which may vary considerably with scene light, at the same resistive value of the cell, thereby avoiding inaccuracies as a result of the inherent nonlinear response characteristics of photocells.

The prior art has also taught the use of an adjustably positioned, variable density filter located in front of the photocell so that the quantity of light reaching or "seen by" the photocell can be regulated in a manner to adjust the system for diverse speeds of film without changing the internal resistance of the photocell circuit. A system of this type is shown for example in U.S. Pat. No. 3,312,158 issued Apr. 4, 1967 to D. M. MacMillin and Arthur C. Mueller. Exposure control systems using a variable density filter of the type shown basically in the aforementioned MacMillin et al. patent are not only capable of a high degree of accuracy, but also facilitate automatic adjustment to the speed of a film contained in a cassette using a direct mechanical linkage between feelers engagable by projections or notches in the film cassette correlated to the speed of the film contained therein. One basic problem presented by filter systems of this type, however, is that because of the space limitations within the housing of a camera, only a limited number of different filter densities and correspondingly a limited number of different film speeds can be accommodated where the variable density filter is of the form of a circular disc having a plurality of discrete sectors each with a given optical density. A solution to this problem is approached in the MacMillin et al. system by using intermediate positions of the filter disc; that is, positioning approximately one-half of two filter sectors over the photocell to achieve an aggregate filtering density of a value intended to be midway between the value of each of the two sectors used. One of the major difficulties with this approach is that the cell itself is more sensitive to light values than the filtering or density value which can be achieved as a result of inherent mechanical tolerances in such systems. Hence, a measure of inaccuracy is introduced to the system as a result of this approach to accommodating a larger number of film speeds. In addition, the photocell is "area responsive" or possesses different sensitivity to light over different surface areas thereof exposed to light. Hence, an added measure of inaccuracy can result from a filter having a graduated or diverse filtering density in area portions thereof covering the photocell. In addition, the aggregate density established by splitting two filter disc sectors of given densities does not provide a precise correlation to the intermediate film speeds for which it is intended. Still further, the intermediate filter positions do not extend the range of film speeds covered by the "full" filter positions, but rather permit a further selection of film speeds within that range.

It will be appreciated, therefore, that although automatic exposure control systems have achieved a high degree of sophistication in the prior art, there is need for improvement particularly in the achievement of higher accuracy of system adjustability for correlation to higher number of diverse film speeds.

SUMMARY OF THE INVENTION

In accordance with the present invention, a facility for accurate adjustment of an automatic exposure control system in a photographic camera is provided by positioning a multisector filter disc having discrete sections of different light filtering densities in front of a photoresistive cell connected electrically to a nulling galvanometer in a Wheatstone bridge circuit which, in turn, is adjustable electrically by varying the resistance of an electrical resistance connected to the photoresistive cell by switch means to provide at least two mutually exclusive operating ranges one of which embraces the specific value of film speed employed. The camera in which the system is used is provided with a cassette receiving chamber into which projects first and second feeler members to be engaged respectively by a first projection positioned on the cassette in accordance with the number of available film speeds in one or the other of two mutually exclusive operating ranges and by a second coded notch on the cassette which effects selection by the presence or absence of notch structure of one or the other of the two ranges. The nulling galvanometer is connected to a dual aperture iris having one aperture positioned on the objective axis of the camera and the other aperture positioned on the axis of the photocell so that the amount of scene light impinging on the film is regulated according to the operating range and the amount of scene light reaching the photocell varied by aperture size and the light filter.

Among the objects of the present invention are, therefore: the provision of an improved automatic exposure control system for photographic cameras; the provision of such a system having an improved facility for correlation to a large number of diverse film speeds; the provision of a plurality of mutually exclusive operation ranges; the provision of a system of the type mentioned in which adjustment for different film speeds is accommodated automatically by insertion in the camera of a cassette containing the film; and the provision of such a system which is extremely accurate in operation and yet highly practical in its application.

Other objects and further scope of applicability of the present invention will become apparent from the

BRIEF DESCRIPTION OF THE DRAWINGS

FIG. 2 is a side elevation of a motion picture camera film cassette in accordance with the invention;

FIG. 3 is a front elevation of the film cassette;

FIG. 4 is a side elevation showing the side of the cassette opposite from that shown in FIG. 2;

FIG. 5 is a top plan view of the film cassette;

DETAILED DESCRIPTION OF THE PREFERRED EMBODIMENT

Figure 1:
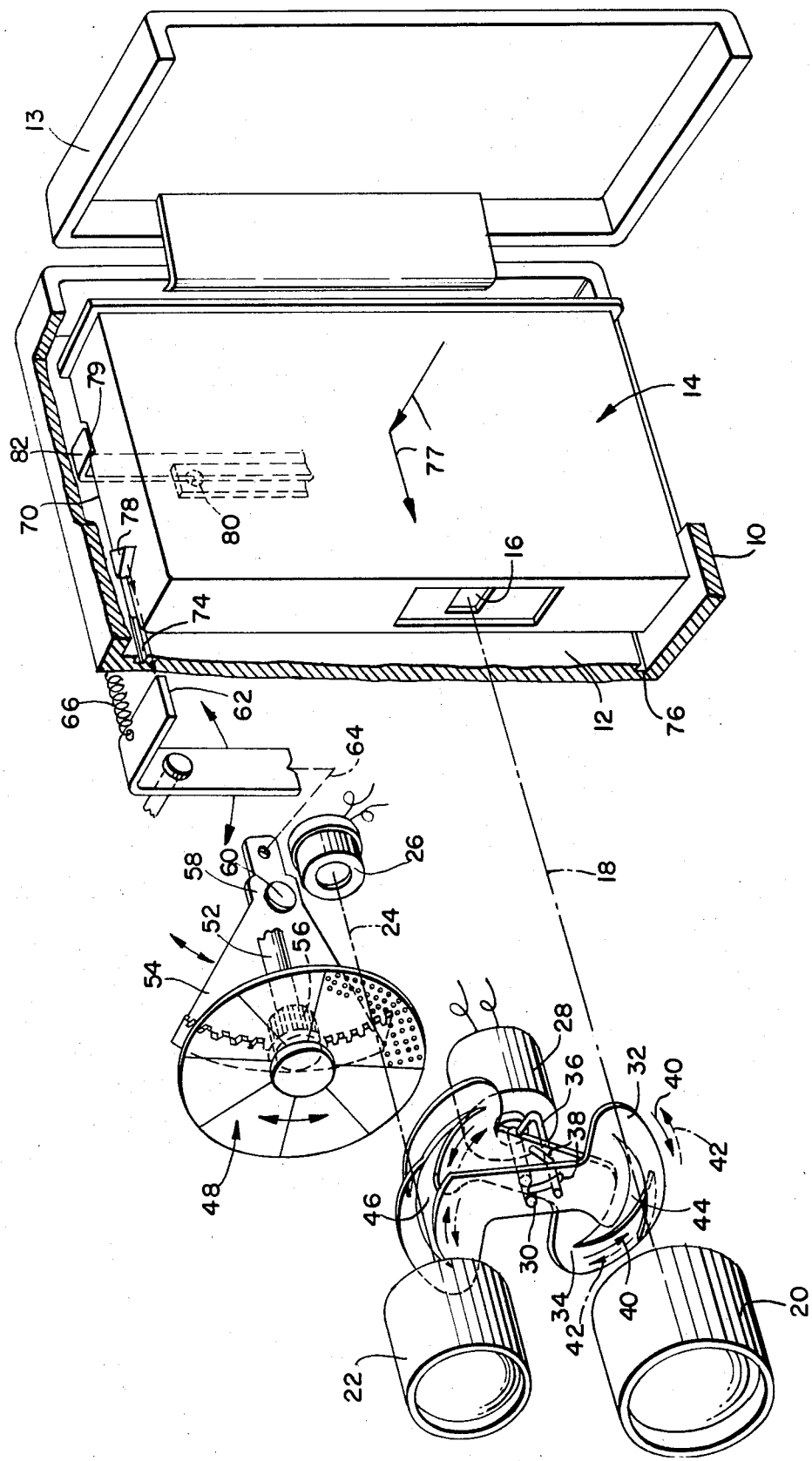
FIG. 1 is an exploded perspective view illustrating the physical working components of the exposure control system of this invention.

In the interest of clearly illustrating the structural and functional components of a preferred embodiment of the invention, only those parts of the motion picture camera with which the invention is used are depicted by illustration in the drawing. For example, standard motion picture camera components such as the drive motor, motor control film drive mechanisms and the like do not have a direct bearing on the exposure control system of the invention and are omitted from the drawing. In addition, the camera housing or casing containing these standard camera components as well as those illustrated in the drawing has been largely omitted from the drawing again in the interest of clarity. A fragment of the camera housing, however, is shown in FIG. 1 and designated by the reference numeral 10. Also as shown, this portion of the housing 10 defines a cassette chamber 12 having an access door 13 and adapted to receive a cassette 14 containing the film to be exposed in such a manner that a film gate or opening 16 on the cassette is accurately positioned on the axis 18 of the camera objective lens 20 supported by the camera housing in conventional fashion. An auxiliary lens 22 is similarly supported by the camera housing 10 at a position above the objective lens 20. The axis 24 of the lens 22 essentially parallels the objective lens axis 18 and is concentric with the light sensitive surface of a photocell 26.

The photocell 26 is electrically connected by circuit means, described in more detail below, to a nulling galvanometer 28 having an output shaft 30 freely or rotatably supporting a pair of iris blades 32 and 34. As shown in FIG. 1, the iris blades 32 and 34 are interconnected by an eccentric pin 36 on the shaft 30 and extending through cam slots 38 in the blades. As a result of this arrangement, rotation of the shaft 30 in one direction will oscillate both blades 32 and 34 in the direction of the solid arrows 40 whereas rotation of the shaft in the opposite direction will oscillate the blades in the direction of the dashed line arrows 42. Although the pin and slot interconnection of the iris blades with the shaft of the galvanometer is used in the illustrated embodiment, it will be appreciated that other forms of motion translating devices, such as gears, cams and the like, might be used to achieve a corresponding movement of the iris blades 32 and 34 in response to rotation of the galvanometer shaft 30. The iris blades 32 and 34, as shown in FIG. 1, are shaped to establish a pair of variably sized apertures 44 and 46 positioned respectively on the objective axis 18 of the camera and on the axis 24 of the lens 22 and photocell 26. In this way the amount of light permitted to pass through the lens 22 to the photocell 26 by the aperture 46 will be correlated directly to the amount of light reflected from the object to be photographed, through the object lens 20 and the opening 16 by the irris aperture 44.

Figure 6:
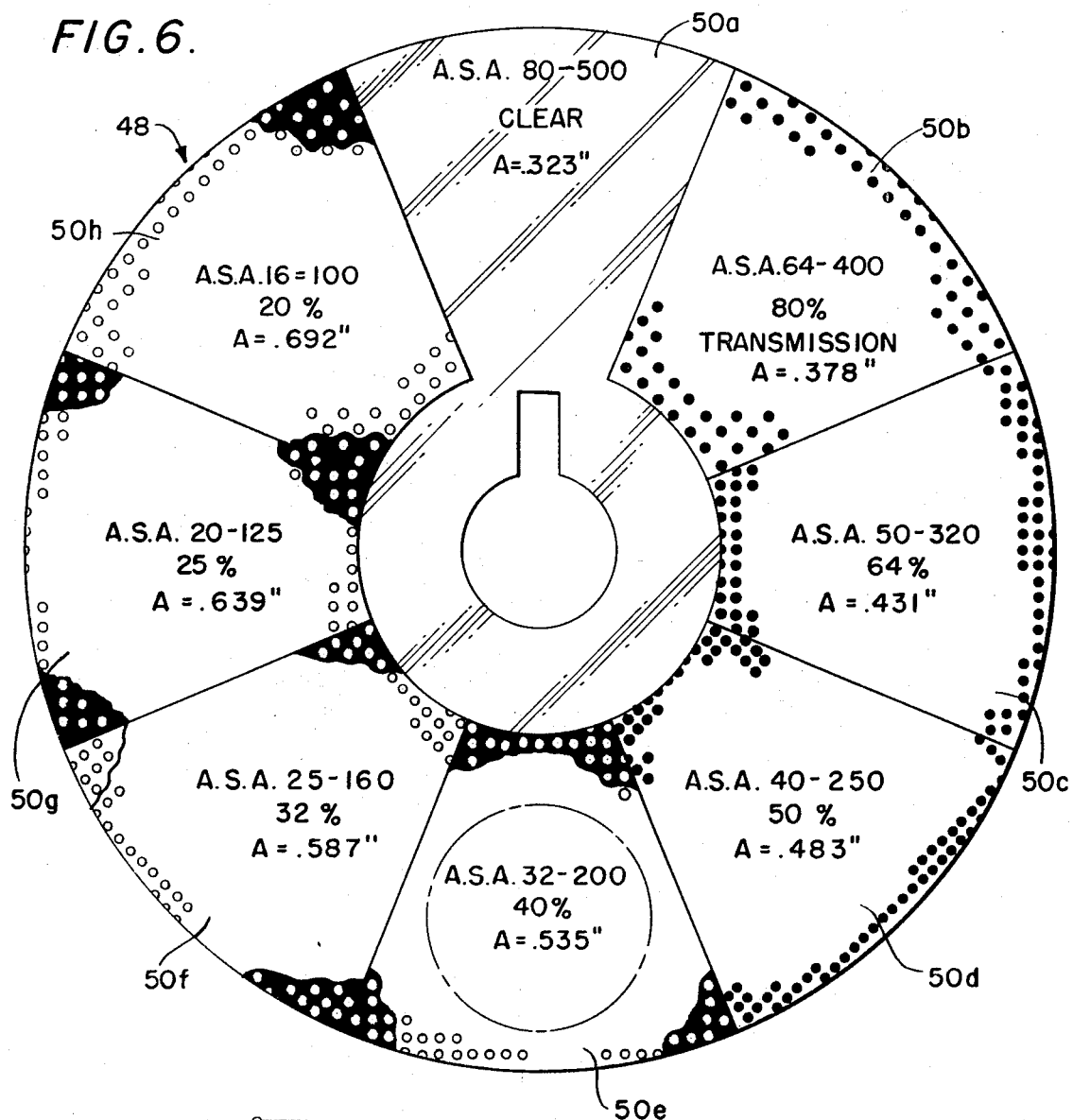
FIG. 6 is an enlarged front elevation of the filter disc used in the exposure control system of this invention.

Situated between the photocell 26 and the iris blades 32 and 34 is rotatable light filter disc 48 in the illustrated embodiment of the invention having multiple (specifically eight) discrete sections 50a–h of different light filtering densities (see also FIG. 6). The filter disc 48 is supported by a shaft 52 offset from the photocell axis 24 so that any one of the filter sectors may be moved with the area center of each sector on the axis 24. Regulating movement of the filter disc is effected by a gear sector 54 meshing with a pinion gear 56 keyed to the shaft 52, the gear sector 54 being part of an oscillatable plate 58 supported pivotally by pin 60 from a part (not shown) of the camera housing 10. Oscillation of the gear 54 to bring about movement of the filter disc 48 is effected by movement of a feeler member or finger 62 connected to the gear sector plate 58 by an appropriate mechanical linkage represented by the dashed line 64. Also, the finger 62 is biased to an initial or inactive position by a tension spring 66 as shown in FIG. 1.

The cassette 14, as shown in FIGS. 1–5 of the drawings, is generally of rectangular configuration and is provided with the opening 16 on the front or leading edge surface thereof as above mentioned. The back edge of the cartridge is provided with a peripheral flange 68 projecting beyond the body of the cartridge on the top, bottom and side edges as shown in the drawings. Formed along the top and bottom edges of one side of the cartridge are upper and lower guide ribs 70 and 72 as shown in FIG. 2 of the drawings. The ribs 70 and 72 respectively engage in complementary tracks 74 and 76 formed in the cassette receiving chamber 12 in the housing 10. By inserting the cassette in the manner indicated by the arrows 77, it will be appreciated that the cassette may be accurately guided into the camera housing 10 and also that the final or operative position of the cassette within the camera is positively established by the peripheral flange 68 engaging shoulders (not shown) in the chamber 12.

Secured to the top of the cassette such as by electronsonic welding or the like is a tactile discontinuity, or lug 78, the leading edge of which is displaced from the front face of the cassette by a distance A as shown in FIG. 4 of the drawings. Although the particular size of the dimension A will be discussed in more detail below, it will suffice for the present to note that the lug 78 is positioned on the cassette 14 at the time it is loaded in a manner such that the dimension A is correlated precisely with the particular speed of film loaded into the cassette, thereby to provide a coded indication of film speed.

Referring again to FIG. 1 of the drawings it will be noted that the rear edge of the finger 62 is positioned to be engaged by the leading edge of the lug 78 as the cassette 14 is inserted into the chamber 12 of the camera housing 10. Depending on the location of the lug 78 along the upper surface of the cassette, specifically its leading edge as defined by the dimension A, the finger 62 will be advanced against its spring bias to indicate an appropriate one of the filter sectors 50 on the axis 24 of the photocell 26.

In addition to the lug 78, it will be noted that the cassette is provided with an indicating position represented by the presence or absence of structure in the embodiment illustrated which takes the form of a notch 79 formed in the upper rib 70. A two position switch 80 supported within the camera housing 10 is provided with a feeler button 82 adapted to register with the notch 79 when the cassette is fully loaded. As will become apparent from the description following below, the position to which the switch is moved by the feeler button 82 and the response to the cassette indication will depend on the presence or absence of the notch 79 in the rib 70. In other words, one position of the switch will be established by the presence of the notch 79 in the rib whereas the other position of the switch will be established by rib itself in the absence of the notch 79 whereby switch 80 is responsive to the indication provided.

Figure 7:
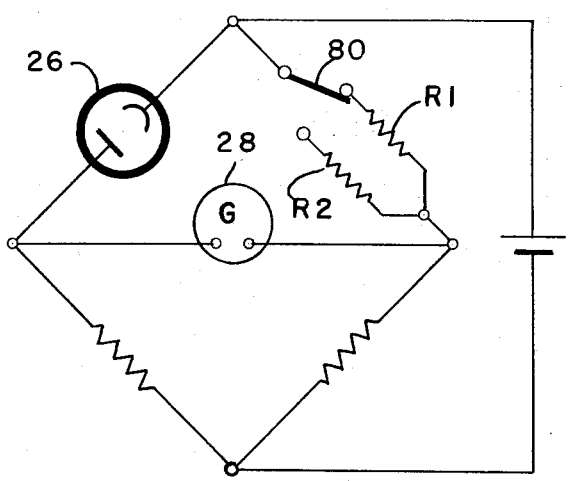
FIG. 7 is a diagram illustrating the electrical circuit of the system.

As shown in FIG. 7 of the drawings, the photocell 26 is incorporated as a photoresistive element in a Wheatstone bridge circuit including the galvanometer 28 and the switch 80 which regulates the circuit by connecting either of two resistors R-1 and R-2 to vary the circuit resistance. Because of this circuit, it will be appreciated that although the resistance of the photocell 26 will vary solely as a result of light seen or received by the cell, the galvanometer 28 can be made to null at two different light or resistance values of the photocell by switching into the circuit one or the other of the two different fixed resistance values of the resistors R-1 and R-2. Thus, in response to the presence or absence of the notch 79, a selection is made of one of two mutually exclusive operating ranges by varying the value of the electrical resistance connected to the photocell 26. These two operating ranges are mutually exclusive and not a further selection within the same range. The two ranges, therefore, cannot embrace the same film speed.

A more complete understanding of the filter disc 48 and its correlation to specific film speeds may be had by reference to FIG. 6 of the drawings. As shown, the filter or light interception density graduation between the sectors 50a–50d is effected by uniformly spaced opaque dots 84 on a transparent matrix, the spacing between the dots 84 diminishing to provide graduated increases in density of the sectors. The graduated filter density of the sectors 50e–h, on the other hand, is accomplished by an opaque matrix provided with light apertures or opening 86 spaced at progressively larger distance intervals from sector to sector to achieve respectively higher sector densities. Considering the relation of the disc 48 to the lens 22 and photocell 26 as shown in FIG. 1 of the drawings, it will be appreciated that when the sector 50a is positioned on the photocell axis 24 all of the light passing through the lens 22 will pass through the filter disc to the photocell 26. On the other hand when the sector 50h is aligned with the photocell axis 24, only twenty percent of the light passing through the lens 22 will be seen by the photocell 26. Thus, the amount of light received by the photocell 26 is varied in response to the tactile indication of the specific film speed within the selected operating range.

The operation of the system thus described to expose film in the cassette 14, the speed of which is correlated or coded by a combination of the location of the lug 78 in terms of the dimension A and the presence or absence of the notch 79, will now be described with reference to FIGS. 1, 6 and 7 of the drawings. Assuming, for example, that the speed of the film in the cassette 14 is rated at A.S.A. 80, the lug 78 will be positioned so that the dimension A is equal to 0.323 inches. Upon insertion of the cassette 14 into the chamber 12 of the camera housing 10, the filter disc 48 will be indexed so that the clear sector 50a will be positioned on the axis 24 of the photocell 26. Since film of the speed, A.S.A. 80, is in the low range of film speeds contemplated by the insertion, the notch 79 will not be present in the particular cassette now in the camera so that the rib 70 on the cassette will hold the pushbutton feeler 82 and the switch 80 in a position to activate the resistor R-1 in the photocell circuit shown in FIG. 7.

Light from the scene to be photograhed will pass through the camera objective lens 20, the iris blade aperture 44 and to the film through the opening 16 in the cassette. The same scene light will pass through the auxiliary or photocell lens 22, the iris blade aperture 46, the sector 50a on the filter disc 48 and to the photocell 26. Assuming that the amount of scene light passing through the aperture 44 to the opening 16 is greater than it should be for proper exposure of the film at the opening 16, thus requiring a reduction in the size of the iris blade aperture 44, the same excess of light will be seen by the photocell 26 through the iris blade aperture 46 and cause the photocell circuit to be out of balance. The galvanometer 28 will therefore drive the iris blades in the direction of the solid arrows 40 to close both the aperture 44 and the aperture 46 until the light seen by the photocell and correspondingly the resistance of the photocell is adjusted to null the galvanometer 28. When the galvanometer nulls in this way, the size of the diaphragm or iris blade aperture 44 on the objective axis 18 of the camera will be adjusted to admit the correct amount of light reflected from the scene to be photographed through the objective lens 20 for proper exposure of the film.

Given the same scene lighting conditions but using a film with a speed of A.S.A. 40, the only change in the system will be as a result of the lug 78 positioned so that the dimension A is equal to 0.483 inches. This relatively different position of the lug on the cassette will position the filter disc 48 to align the sector 50d on the axis of the photocell 26. Inasmuch as the speed of film is still within the low range of speeds contemplated by the present invention, the notch 79 again will be absent to that switch 80 remains closed on the resistor R-1 of the photocell circuit. The nulling galvanometer 28 will operate the iris blades in the same manner as described in the preceding paragraph but because the film speed in this instance (A.S.A. 40) is slower than the film of the previous example, and will require a relatively greater amount of light for proper exposure, the galvanometer will null when the iris blade apertures 44 and 46 are larger than in the preceding example. This result obtains because only 50 percent of the light passing through the lens 22 and the iris aperture 46 will be seen by the photocell 26. Correspondingly the aperture 44 will be large allowing more light passing through the objective lens 20 to reach the relatively slower film.

In light of the two examples given, the operation of the system to accommodate other speeds of film within the low range (i.e., A.S.A. 64, A.S.A. 50, A.S.A. 32, A.S.A. 25, A.S.A. 20 and A.S.A. 16) will be essentially similar, the only difference being the amount of movement experienced by the iris blades 32 and 34 required to effect nulling of the galvanometer 28, such movement also having a direct correlation to the size of the objective lens aperture 44. Though in both of the examples given, movement of the iris blades to null the galvanometer 28 was described as closing or in the direction of the solid arrows 40 in FIG. 1, quite obviously, where scene light is less than that for proper film exposure at the initial position of the blades, the galvanometer will reach its null position by opening the iris blades in the direction of the dashed line arrows 42 of the FIG. 1.

Where the film speed is in the high range contemplated by the invention; that is A.S.A. 100–500, the cassette 14 containing such film will include the notch 79 so that the position of the switch 80 will be changed to connect the photocell circuit with the resistor R-2 of the circuit shown in FIG. 7. This will cause the galvanometer to null at a different level of light seen by the photocell 26. Specifically, the galvanometer will null when the iris blade aperture 46 is substantially smaller than it does in the low range of operation thereby establishing a smaller objective aperture 44 for the same amount of scene light to accommodate the higher sensitivity or speed of the film. The operation of the filter disc 48 in the high range with the switch connected to the resistor R-2 will be the same as the described operation in the low range, as indicated by the legends on the respective sectors 50 as shown in FIG. 6 of the drawings.

Thus it will be seen that the illustrated embodiment of this invention provides an improved automatic exposure control system for motion picture cameras which can accommodate as many as 16 different speeds of film without requiring any manual adjustment by the operator other than inserting the film cassette into the camera. It will also be appreciated that many changes may be made in the embodiment described herein without departing from the true spirit of the present invention. Accordingly, it is expressly intended that the described embodiment is illustrative only, not limiting, and the true spirit and scope of the present invention be determined by reference to the appended claims.

What is claimed is:

1. A photographic system comprising:
   A film handling cassette including:
      photographic material;
      first means for indicating one of a plurality of mutually exclusive ranges of film speed, said one range embracing the speed of said photographic material; and
      second means for indicating the particular speed of said photographic material within said one range; and
   a camera including:
      an objective lens;
      means for receiving said cassette with its said photographic material disposed in operative relationship with said lens;
      a light sensitive element responsive to scene light;
      means responsive to said light sensitive element for varying the amount of scene light impinging on such photographic material, said scene light varying means being selectively operable in more than one of a plurality of operating ranges respectively correlated to said plurality of film speed ranges;
      means responsive to said first indicating means when said cassette is positioned in said receiving means for regulating said light varying means for operation in the one film speed range; and
      means responsive to said second indicating means when said cassette is positioned in said receiving means for regulating the amount of scene light received by said light sensitive element in accordance with the particular speed of said photographic material within said one range.

2. A camera for use with a film handling cassette including photographic material, such cassette having first means for indicating one of a plurality of mutually exclusive ranges of film speed, such one range embracing the speed of such photographic material, and second means for indicating the particular speed of such photographic material within such one range, said camera comprising:
   an objective lens;
   means for receiving such cassette with such photographic material disposed in operative relationship with said lens;
   a light sensitive element responsive to scene light;
   means responsive to said light sensitive element for varying the amount of scene light impinging on such photographic material, said scene light varying means being selectively operable in more than one of a plurality of operating ranges respectively correlated to such plurality of film speed ranges;
   means responsive to such first indicating means when such cassette is positioned in said receiving means for regulating said light varying means for operation in the one of said operating ranges correlated to such one film speed range; and
   means responsive to such second indicating means when such cassette is positioned in said receiving means for regulating the amount of scene light received by said light sensitive element in accordance with the particular speed of such photographic material within said one range.

3. The camera of claim 2 wherein said means for regulating said light varying means is automatically responsive to such first indicating means when such cassette is positioned in said receiving means.

4. The camera of claim 2 wherein said means for regulating the amount of scene light received by said light sensitive element is automatically responsive to such second indicating means when such cassette is positioned in said receiving means.

5. The camera of claim 2 wherein said means for regulating said varying means comprises switching means and means for actuating said switching means responsive to said first means.

6. The camera of claim 2 wherein said means for regulating the amount of scene light received by said light sensitive element comprises a light filter having multiple discrete sections of differing light filtering densities.

7. The camera of claim 2 wherein said light sensitive element is a photocell having a photoresistive element, wherein said light varying means includes a nulling galvanometer connected with said photocell in a bridge circuit, an iris means defining a pair of directly variable apertures respectively operable to regulate the amount of scene light passing to said photocell and to such photographic material, said bridge circuit comprising a pair of resistors having diverse resistance values, and wherein said means for regulating said varying means includes switch means for connecting one or the other of said resistors in said bridge circuit.

8. A film handling cassette for use with a camera, such camera including an objective lens, means for receiving said cassette with photographic material housed therein disposed in operative relationship with said lens, a light sensitive element responsive to scene light, means responsive to said light sensitive element for varying the amount of scene light impinging on photographic material housed within said cassette, such scene light varying means being selectively operable in more than one of a plurality of operating ranges respectively correlated to a plurality of mutually exclusive film speed ranges, means responsive to indicating means separate from such camera for regulating such light varying means for operation in a selected one of such operating ranges, and means responsive to indicating means separate from such camera for regulating the amount of scene light received by such light sensitive element, said cassette including:
photographic material;
first means for indicating to such means for regulating such light varying means, when said cassette is positioned in such receiving means, one of a plurality of mutually exclusive ranges of film speed, said film speed ranges being respectively correlated with such plurality of operating ranges and said one film speed range embracing the specific film speed of said photographic material; and
second means for indicating to such means for regulating the amount of scene light received by such light sensitive element, when said cassette is positioned in such receiving means, said specific value of said light sensitive characteristic of said photographic material within said one film speed range.

9. The cassette of claim 8 wherein said first means comprises a position on said cassette represented by the presence or absence of structure.

10. The cassette of claim 9 wherein said second means comprises a tactile discontinuity on said cassette.

11. The cassette of claim 8 wherein said first means comprises a tactile discontinuity on said cassette.

12. The cassette of claim 8 wherein such second means comprises a lug projecting from said cassette, the correlation thereof to film speed being effected by the location of said lug relative to the leading edge of the cassette.

13. A photographic system comprising:
a film handling cassette including:
a photographic material;
first means for indicating one of a plurality of mutually exclusive ranges of film speeds, said one range embracing the speed of said photographic material; and
second means for indicating the particular speed of said photographic material within said one range; and
a camera including:
a light sensitive element responsive to scene light;
means defining an aperture;
means for receiving said cassette with its said photographic material disposed in operative relationship to said aperture;
means for varying the size of said aperture responsive to said light sensitive element, said aperture size varying means being selectively operable in more than one of said plurality of film speed ranges;
means for regulating said aperture size varying means for operation in said one film speed range responsive to said first indicating means when said cassette is positioned in said receiving means;
a light filter having multiple discrete sections of differing light filtering densities; and
means for positioning a selective one of said filter sections in operative relationship with said light sensitive element responsive to said second indicating means when said cassette is positioned in said receiving means.

14. A camera for use with a film handling cassette including photographic material, such cassette having first means for indicating one of a plurality of mutually exclusive ranges of film speeds, such one range embracing the speed of such photographic material and second means for indicating the particular speed of such photographic material within such one range, said camera comprising:
a light sensitive element responsive to scene light;
means defining an aperture;
means for receiving such cassette with such photographic material disposed in operative relation to said aperture;
means for varying the size of said aperture responsive to said light sensitive element, said aperture size varying means being selectively operable in more than one of such plurality of film speed ranges;
means for regulating said aperture size varying means for operation in such one film speed range responsive to such first indicating means when such cassette is positioned in said receiving means;
a light filter having multiple discrete sections of differing light filtering densities; and
means for positioning a selected one of said filter sections in operative relationship with said light sensitive element responsive to such second indicating means when such cassette is positioned in said receiving means.

15. The camera of claim 14 wherein said filter section positioning means is automatically responsive to such second indicating means when such cassette is positioned in said receiving means.

16. The camera of claim 14 wherein said aperture size varying means includes an electrical resistance connected to said light sensitive element and said regulating means comprises means for varying the value of said electrical resistance.

17. The camera recited in claim 14 wherein said light filter comprises a rotatably indexable disc, said discrete filter sections being established as sectors of said disc.

18. The improvement recited in claim 17 wherein one-half of the sectors are established by uniformly spaced opaque dots on a transparent matrix whereas the other half of said sectors are established by transparent apertures on an opaque matrix, the spacing of said dots and apertures being uniform throughout the area of each sector and varied from sector to sector to achieve graduated filter densities.

* * * * *